Dec. 5, 1961  A. H. NEUMANN  3,011,801
TRAILER COUPLING
Filed April 15, 1960  3 Sheets-Sheet 1

INVENTOR
Arthur H. Neumann,
BY Diggins & Le Blanc
ATTORNEYS

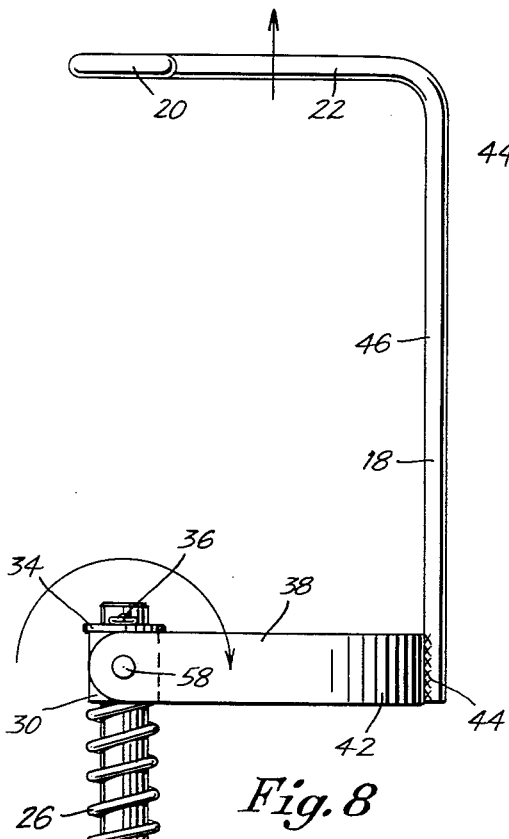
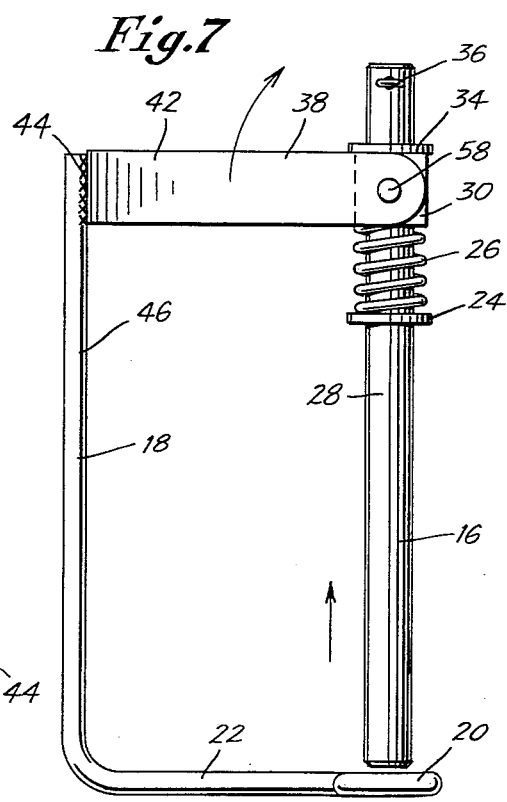
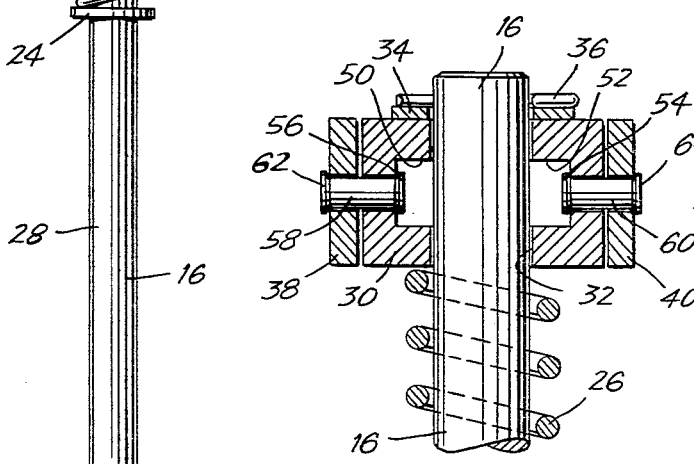

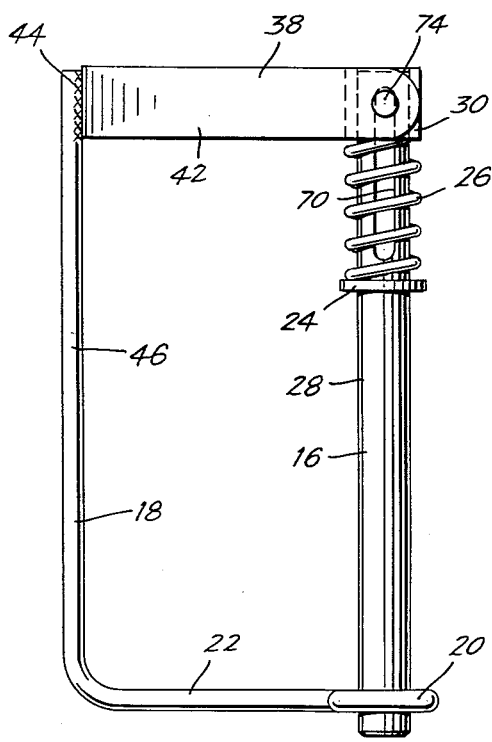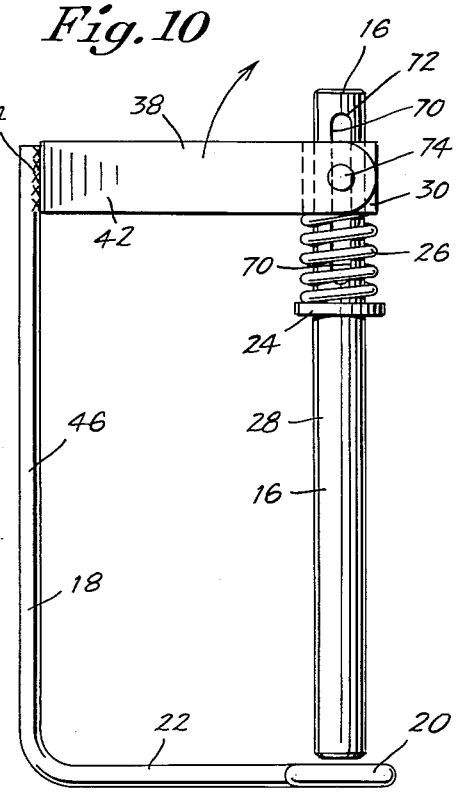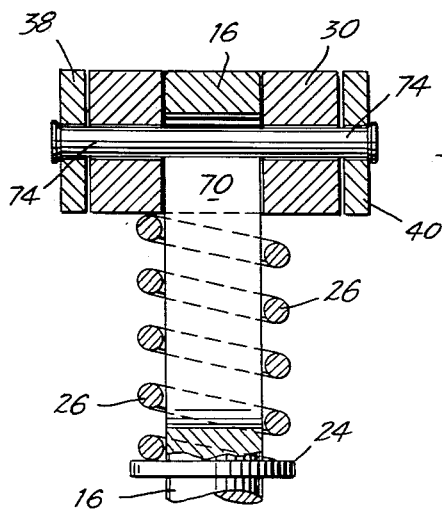

United States Patent Office 3,011,801
Patented Dec. 5, 1961

3,011,801
TRAILER COUPLING
Arthur Henry Neumann, Rte. 1, Box 140,
Ropesville, Tex.
Filed Apr. 15, 1960, Ser. No. 22,471
6 Claims. (Cl. 280—515)

This invention relates to a coupling pin and more particularly to a coupling pin for trailer hitches.

As is well known it is customary to couple elements such as a towed and a towing vehicle together by means of a coupling pin inserted through a mating tongue and fork, which latter elements extend outwardly from the respective vehicles. To insure that the pin will not become lost or disengaged during use a retaining frame is often provided with means for removably locking the frame to the pin. The frame in conjunction with the pin, when in the locked position, constitutes a completely enclosed member which cannot be dislodged from the mating tongue and fork of a trailer hitch.

The present invention provides a novel coupling pin for joining two members together which is particularly suited for use in conjunction with trailer hitches between an automobile and a trailer. The pin is provided with a substantially U-shaped frame member which is pivoted about one end of the pin and removably attached to the opposite end of the pin. The coupling unit of the present invention is of relatively simple, inexpensive construction and is extremely reliable in operation. An important feature of the coupling pin of the present invention is its ease of removal from a trailer hitch or the like brought about by the fact that the locking frame doubles as a handle which may be readily grasped for removing the pin from a mating tongue and fork coupling.

It is therefore a primary object of the present invention to provide a novel coupling pin.

Another object of the present invention is to provide a coupling pin particularly suited for trailer hitches.

Another object of the present invention is to provide a coupling pin of relatively simple inexpensive construction having increased reliability during operation.

Another object of the present invention is to provide a coupling pin which may be readily removed from a trailer hitch.

These and other objects and advantages of the invention will be more apparent upon reference to the following specification claims and appended drawings wherein:

FIGURE 6 is a partial cross section through the pivot block of the coupling pin of FIGURE 2;

FIGURE 7 shows the coupling pin of FIGURE 2 in the spring compressed position with the frame free to rotate upwardly above the pivot block;

FIGURE 8 shows the coupling pin of FIGURE 2 with the frame rotated through 180° for use as a handle for removing the coupling pin from the trailer hitch;

FIGURE 9 shows a modified embodiment of the novel coupling pin of the present invention;

FIGURE 10 shows the coupling pin of FIGURE 9 in spring compressed position with the frame free to rotate upwardly about the pivot block; and FIGURE 11 is a cross section through the pivot block and upper portion of the modified coupling pin of FIGURE 9.

Figure 1:
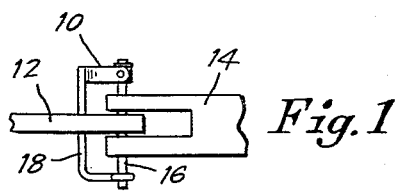
FIGURE 1 shows a conventional tongue and groove trailer hitch incorporating the novel coupling pin of the present invention.

Referring to the drawings, FIGURE 1 illustrates the novel coupling pin of the present invention generally indicated at 10 used to couple the tongue 12 to the fork 14 of a conventional trailer hitch. The tongue 12 conventionally forms a part of the car, truck or other towing vehicle and the fork 14 conventionally is affixed to the trailer or other vehicle to be towed. The parts 12 and 14 can of course be reversed if desired. The coupling pin 10 of the present invention includes a pin shaft 16 and a pin frame 18 of generally U-shaped configuration. The frame 18 in operation is attached to both ends of the shaft 16 which shaft passes through suitable apertures in the tongue and fork locking these two members together in a well known manner.

Figure 2:
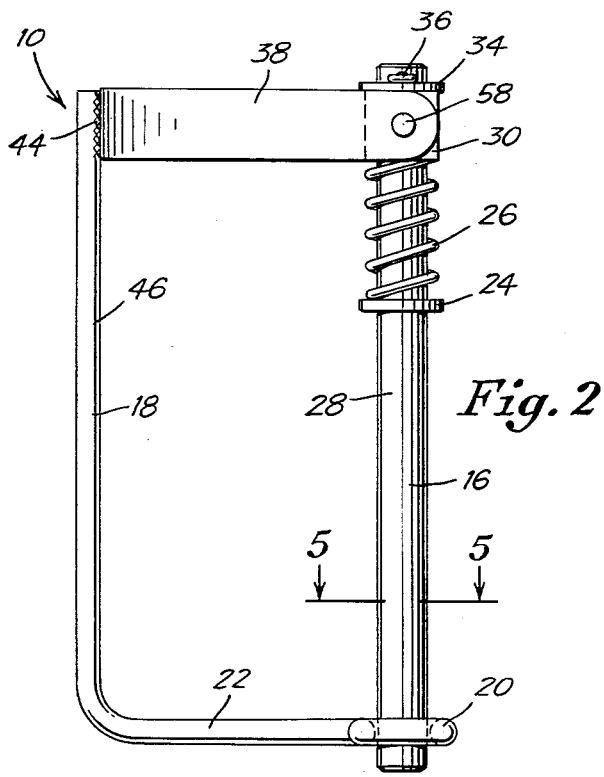
FIGURE 2 is a side view of the coupling pin of the present invention.
Figure 3:
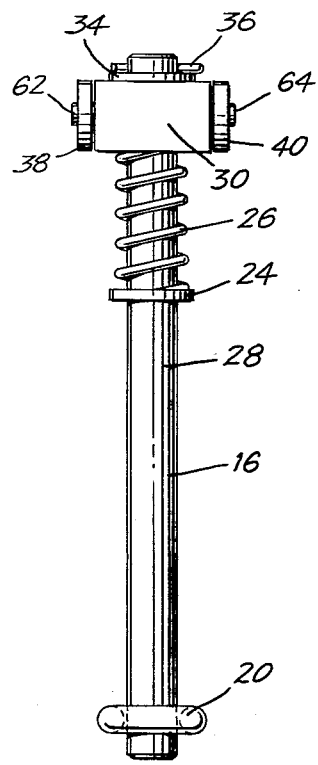
FIGURE 3 is an end view of the coupling pin shown in FIGURE 2.
Figure 4:
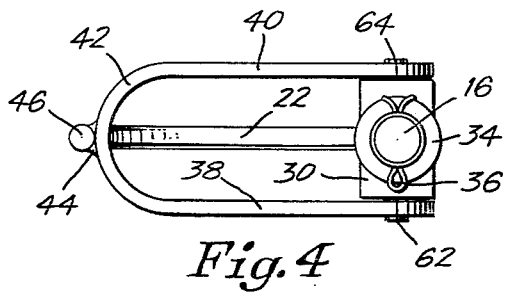
FIGURE 4 is a plan view of the coupling pin.
Figure 5:
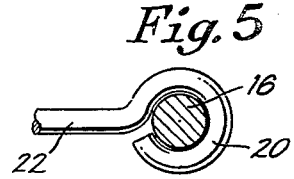
FIGURE 5 is a partial cross section taken along line 5—5 of FIGURE 2.

Referring to FIGURES 2 through 8 the lower end of shaft 16 is slidably received in an eyelet 20 formed on the end of lower arm 22 of the frame 18 as best seen in FIGURE 5. Approximately midway of its ends, shaft 16 carries a collar 24 upon which bears one end of a coiled compression spring 26. The collar 24 may be in the form of a washer welded or otherwise suitably secured to the shaft or if desired may be formed integral with the shaft 16. The lower end of the shaft 16 beneath the collar 24 which portion is indicated at 28 forms the insert portion of the pin which actually locks the tongue and fork of a trailer hitch.

The opposite end of spring 26 bears upon a head 30 in the form of a substantially solid metallic block having a central circular aperture 32 which slidably receives the upper end of shaft 16. The head 30 is secured to the shaft between the upper end of spring 26 and a washer 34 freely slidable over the upper end of the shaft. The washer is retained against leaving the end of the shaft by a cotter pin 36 passing through the end of the shaft 16.

Engaging opposite sides of the head 30 are the arms 38 and 40 of a generally U-shaped strap or yoke 42. The bight portion of strap 42 is welded as at 44 or otherwise suitably secured to a vertical rod 46 which has at its lower end the arm 22 with eyelet 20. Strap 42 in conjunction with rod 46 forms the frame 18 generally referred to above.

As best seen in FIGURE 6, head 30 in addition to central aperture 32 is provided with a pair of re-entrant chambers 50 and 52 receiving the enlarged heads 54 and 56 of a pair of rivets 58 and 60. Rivets 58 and 60 also include outer enlarged heads 62 and 64. As can be seen the rivets 58 and 60 provide a pivotal support for the arms 38 and 40 of strap 42 so that these arms may pivot about head 30.

Referring to FIGURE 7, if a compressive force is applied to the spring 26 between strap 42 and collar 24, the spring is compressed between head 30 and collar 24 and the frame 18 moves downwardly with respect to shaft 16 until the eyelet 20 clears the lower end of the shaft as indicated in FIGURE 7. In this position, the spring 26 is compressively stressed while the frame 18 comprising strap 42 and rod 46 carrying arm 22 and eyelet 20 are all free to pivot about rivets 58 and 60 in the direction of the arrow in FIGURE 7. As can be seen the frame is free to pivot through almost 360° about the end of the shaft 16. However, when the frame has pivoted 180° into the position shown in FIGURE 8 it is ideally suited as a handle which may be grasped from above and pulled upwardly in the direction of the arrow in FIGURE 8 to disengage the pin and particularly the lower portion 28 of the shaft 16 from trailer hitch members. It is completely unnecessary to reach downwardly below the trailer hitch into an area which is often times dirty and not readily accessible but rather the pin of the present invention may be withdrawn by simply pressing down upon the frame, pivoting it outwardly and away from the pin into the upright position shown in FIGURE 8 and then using the arm 22 as a handle for withdrawing the pin from the tongue and fork members of the trailer hitch. In this way, it is possible to easily remove the pin from a trailer coupling, particularly in the situations where the pin may be frictionally engaged by the tongue and fork members which tend to make it more difficult to withdraw.

FIGURES 9 through 11 show a modified embodiment of the novel trailer hitch coupling pin of the present invention wherein corresponding parts bear like reference numerals to those employed in the embodiment shown in FIGURES 1 through 8. In the embodiment of FIGURES 9 through 11 the coupling pin 16 is provided with an elongated slot 70 at its upper end which extends entirely through the pin and terminates at its lower end adjacent collar 24 and at its upper end just short of the top of the pin as indicated at 72 in FIGURE 10. In the embodiment of FIGURES 9 through 11, a single pivot pin or rivet 74 passes entirely through the pivot block 30 to pivotally join arms 38 and 40 to the pivot block. As pin 16 slides upwardly through the pivot block 30 from the position shown in FIGURE 9 to the position shown in FIGURE 10, pin 74 slides through slot 70 until the frame clears the lower end of the pin 17 so that the frame by means of arms 38 and 40 may be pivoted about pin 74 in the same manner as the previous embodiment of FIGURES 1 through 8. When the frame in FIGURE 10 is rotated through 180° into a position corresponding to the position shown in FIGURE 8, the lower portion 22 of the frame may be used as a handle to withdraw the pin from a hitch type coupling.

It is apparent from the above that the present invention provides a novel coupling pin for joining members of any type, which pin has general utility. The coupling pin of the present invention, however, is particularly suited for trailer hitches. An important advantage of the pin of the present invention is that it may be readily and easily disengaged from a trailer hitch and the locking frame may be used as a convenient handle for withdrawing the pin. The coupling pin is of relatively simple inexpensive construction and is completely reliable in operation. The sureness with which the eyelet 22 of the frame engages the lower end of the shaft 16 may be controlled by varying the resistance of spring 26. For heavy duty use it is preferable to increase the strength and size of the spring so that it does not easily become disengaged from the lower end of the shaft. In most cases, however, the pin may be readily compressed by hand, the frame pivoted about head 30 and then used as a handle to withdraw the pin from a trailer hitch.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A trailer coupling comprising a mating trailer tongue and fork having aligned slots, a coupling pin comprising a shaft slidably received in said slots, a substantially U-shaped rigid frame, one leg of said frame terminating in a retainer slidably received over one end of said shaft, a collar intermediate the ends of said shaft, pivot means on the other leg of said frame slidably receiving the other end of said shaft, said pivot means permitting rotation of said frame in a plane containing the longitudinal axis of said shaft, and a compression spring surrounding said shaft between said pivot means and said collar.

2. A trailer coupling according to claim 1 wherein said pivot means comprises a block having a central aperture slidably receiving said shaft, said other leg of said frame comprises a yoke engaging opposite sides of said block, and rivet means pivotally connecting said yoke to said block.

3. A trailer coupling according to claim 2 wherein said retainer comprises an eyelet slidable over the end of said shaft.

4. A trailer coupling according to claim 2 wherein the spaced arms of said yoke are each connected to opposite sides of said pivot block by separate rivets.

5. A trailer coupling according to claim 2 wherein the spaced arms of said yoke are connected to opposite sides of said pivot block by a single rivet.

6. A trailer coupling according to claim 5 wherein said shaft includes a central elongated slot providing sliding clearance for said rivet and terminating just short of the end of said shaft at one end and short of said collar at the other end.

References Cited in the file of this patent

UNITED STATES PATENTS

| | | |
|---|---|---|
| 2,367,874 | Kelley | Jan. 23, 1945 |
| 2,454,856 | Bible | Nov. 30, 1948 |
| 2,514,594 | Weiler | July 11, 1950 |
| 2,759,388 | Annis | Aug. 21, 1956 |